(12) United States Patent  
Papernyi et al.

(10) Patent No.: US 7,508,575 B2  
(45) Date of Patent: Mar. 24, 2009

(54) CASCADED PUMP DELIVERY FOR REMOTELY PUMPED ERBIUM-DOPED FIBER AMPLIFIERS

(75) Inventors: Serguei Papernyi, Pointe Claire (CA); Vladimir Karpov, Pointe Claire (CA); Vladimir Ivanov, Pointe Claire (CA); Wallace Clements, Pointe Claire (CA)

(73) Assignee: MPB, Montreal, Quebec (CA)

( * ) Notice: Subject to any disclaimer, the term of this patent is extended or adjusted under 35 U.S.C. 154(b) by 258 days.

(21) Appl. No.: 10/520,277

(22) PCT Filed: Sep. 28, 2004

(86) PCT No.: PCT/CA2004/001754

§ 371 (c)(1), (2), (4) Date: Apr. 6, 2006

(87) PCT Pub. No.: WO2006/034562

PCT Pub. Date: Apr. 6, 2006

(65) Prior Publication Data

US 2006/0209394 A1    Sep. 21, 2006

(51) Int. Cl.  
*H04B 10/17* (2006.01)  
*H04B 10/12* (2006.01)

(52) U.S. Cl. .............. 359/334; 359/341.32; 359/341.33

(58) Field of Classification Search ................................  
359/341.32–341.33, 334  
See application file for complete search history.

(56) References Cited

U.S. PATENT DOCUMENTS 5,195,160 A    3/1993    Byron (Continued)

FOREIGN PATENT DOCUMENTS

WO        0152372        7/2001

(Continued)

OTHER PUBLICATIONS

Becker et al. "Erbium-Doped Fiber Amplifiers: Fundamentals and Technology", Academic (San Diego), 1999, pp. 346-348.*

*Primary Examiner*—Eric Bolda (57) ABSTRACT

A method for pumping remote optically-pumped fiber amplifiers (ROPAs) in fiber-optic telecommunication systems is disclosed which uses cascaded Raman amplification to increase the maximum amount of pump power that can be delivered to the ROPA. According to the prior art, high power at the ROPA pump wavelength, $\lambda_p$, is launched directly into the fiber and the maximum launch power is limited by the onset of pump depletion by Raman noise and oscillations due to the high Raman gain at $\sim(\lambda_p+100)$ nm. In preferred embodiments of the present invention, a 'primary' pump source of wavelength shorter than $\lambda_p$ is launched into the delivery fiber along with two or more significantly lower-power 'seed' sources, among which is included one at $\lambda_p$. The wavelength and power of the seed source(s) are chosen such that, when combined with the high-power primary source, a series, n, where $n \geq 2$, of Raman conversions within the fiber ultimately leads to the development of high power at $\lambda_p$. In another embodiment, one or more of the seed sources at wavelengths shorter than $\lambda_p$ are replaced by reflecting means to return, into the fiber, backward-travelling amplified spontaneous Raman scattered light resulting from high power in the fiber at a wavelength one Raman shift below the particular seed wavelength. In either case, the high power at $\lambda_p$ is developed over a distributed length of the fiber, reaching its maximum some distance into the fiber and exceeding the maximum power possible at that point with the prior art.

21 Claims, 9 Drawing Sheets

U.S. PATENT DOCUMENTS

| | | |
|---|---|---|
| 5,883,736 A | 3/1999 | Oshima |
| 6,147,794 A * | 11/2000 | Stentz .................. 359/334 |
| 6,163,396 A * | 12/2000 | Webb .................... 359/332 |
| 6,163,636 A * | 12/2000 | Stentz et al. ............. 385/24 |
| 6,323,993 B1 | 11/2001 | Hansen |
| 6,480,326 B2 * | 11/2002 | Papernyi et al. ......... 359/334 |
| 6,621,619 B2 * | 9/2003 | Strutz et al. ............. 359/334 |
| 6,646,785 B2 * | 11/2003 | Kuksenkov ............. 359/334 |
| 2003/0016437 A1 * | 1/2003 | Islam et al. ............. 359/334 |
| 2006/0198397 A1 * | 9/2006 | Korolev et al. ........... 372/3 |

FOREIGN PATENT DOCUMENTS

| | | |
|---|---|---|
| WO | 0165647 | 9/2001 |
| WO | 03052884 | 6/2003 |
| WO | 03094394 | 11/2003 |

* cited by examiner

FIG-1 (PRIOR ART)

(PRIOR ART)

(PRIOR ART)

CASCADED PUMP DELIVERY FOR REMOTELY PUMPED ERBIUM-DOPED FIBER AMPLIFIERS

FIELD OF THE INVENTION

The present invention relates to amplification in optical fiber telecommunication spans and, more particularly, to remote optically-pumped erbium-doped fiber amplifiers, as are used in submarine fiber optic spans and long distance spans over land.

BACKGROUND OF THE INVENTION

The amplification of optical signals in fiber-optic telecommunication systems is achieved primarily through the use of discrete optical amplifiers, mainly erbium-doped fiber amplifiers (EDFAs), and through distributed Raman amplification (DRA) in which the transmission fiber itself is used as the amplifying medium.

Discrete amplifiers placed as boosters or pre-amplifiers at either end of an optical cable link are sufficient for moderate span lengths and capacities. However, as capacity and/or span length requirements increase in unrepeatered systems, distributed Raman amplification is typically implemented first and then, when even this is not sufficient, architectures with discrete EDFA amplifiers placed out in the cable and pumped remotely from the terminals are used. According to the prior art, these remote optically pumped amplifiers (ROPAs) are pumped by launching high power at 1480 nm from either the receiving terminal of the link in the case of a remote preamplifier or the transmitting terminal for a remote post amplifier. In the latter case, the 1480-nm power is delivered through one or more dedicated pump fiber(s) to avoid any interactions between the launched signal channels and the pump. A remote preamplifier can be pumped via the transmission fiber itself or a dedicated pump fiber or both.

The increase in link budget achievable through the addition of remotely-pumped amplifiers is determined by the maximum distance over which the required ROPA pump power can be delivered. Increasing the amount of pump power launched increases this distance, up to a point. As the launched 1480-nm pump power is increased, the resulting high Raman gain in the 1590-nm region begins to deplete the 1480-nm power delivered to the ROPA via the build-up of Raman noise and eventually, oscillations around 1590 nm. As pointed out by Boubal et al., SubOptic'2001, Kyoto, paper P3.6 (May 2001), the maximum 1480-nm launch power in standard pure silica core fiber (PSCF) for example, is ~1.3 W. In other words, for the effective transmission of the 1480-nm pump energy to the ROPA, the Raman properties of optical fiber place an upper limit on the maximum 1480-nm launch power. This limit can be increased to ~1.9 W by utilizing a segment of Large Effective Area PSCF (E-PSCF) leading away from the 1480-nm launch terminal. See for instance, E. Brandon et al., SubOptic'2001, Kyoto, paper T3.4.1 (May, 2001).

A further increase to ~4 W has been demonstrated by incorporating fused WDM couplers in dedicated pump fibers to act as filters with low loss at 1480 nm but high loss in the region of high Raman gain. See for instance, Boubal et al., SubOptic'2001, Kyoto, paper P3.6 (May 2001). In a recent development, this same group combined the use of a hybrid PSCF/E-PSCF dedicated pump fiber incorporating fused WDM coupler filters with a first-order Raman pumping scheme to further increase the distance over which the required pump power could be delivered to a remote preamplifier. See L. Labrunie et al., Electronics Letters, Vol. 39, No. 19 (September, 2003). In this scheme, they launched high power at 1387 nm along with substantially lower power at 1480 nm from a laser diode. The high power at 1387 nm provided Raman gain for the 1480-nm power as it propagated along the dedicated pump fiber and resulted in a net increase in the 1480-nm power reaching the ROPA compared to a conventional pumping scheme involving the direct launch of high power at 1480 nm alone.

Despite the improvements in delivered pump power provided by these latter developments, they require dedicated pump fibers even for a remotely-pumped preamplifier, a fact which, in and of itself, has significant cost implications. Furthermore, the dedicated pump fiber is a hybrid PSCF/E-PSCF fiber incorporating WDM coupler filters, which adds to the complexity and cost of the pump fiber. In today's cost-sensitive environment, there is an ever-present need for performance improvements which have the least possible negative impact on the cost of fiber-optic communications systems. Thus, a ROPA pumping scheme, such as that disclosed in this application, which increases the pump power deliverable to remote amplifiers and, especially in the case of remote preamplifiers, does so with minimal impact on cost, is highly desirable.

SUMMARY OF THE INVENTION

In a broad aspect, the invention provides a scheme for increasing the amount of pump power that can be delivered to a remote optically pumped amplifier in an optical fiber communication system or, conversely, increasing the distance along the transmission span over which a given amount of pump power can be delivered. According to this scheme, high-order Raman amplification is used to provide amplification in the transmission span itself, or in a dedicated pump fiber, for the relatively low power at the 1480-nm ROPA pump wavelength launched from the receiving or transmitting terminal, for a remote preamplifier or post amplifier, respectively. This pumping scheme can, in a cost-effective manner, significantly improve the pump power delivery compared to prior-art pump delivery schemes.

More specifically, in a typical embodiment, a primary pump source at a predetermined wavelength $\lambda_0$, shorter than the ultimately desired ROPA pump wavelength $\lambda_p$, is launched into the pump delivery fiber (which may be either the transmission fiber itself or a dedicated pump fiber) along with two or more lower-power seed sources at wavelengths $\lambda_{s1} \ldots \lambda_{sn}$, where $n \geq 2$ and $\lambda_0 < \lambda_{sn} \leq \lambda_p$, and where the ensemble of seed sources contains at least one at the ROPA pump wavelength $\lambda_p$. The wavelength and power of the seed sources are specifically chosen such that, in the presence of the pump power at $\lambda_0$, a series of n stimulated Raman conversions ultimately lead to high power at the desired ROPA pump wavelength $\lambda_p$ being present in the fiber traveling toward the ROPA.

In a particular exemplary embodiment, a primary pump source at a wavelength of 1276 nm is launched together with three lower-power seed sources having wavelengths of 1357, 1426 and 1480 nm. Energy at the primary pump wavelength of 1276 nm first undergoes a stimulated Raman conversion to 1357 nm and then, in the second step of a Raman cascade, the resulting high power at 1357 nm is converted to yield high power at 1426 nm which in turn is converted to high power at the 1480-nm seed wavelength, the desired ROPA pump wavelength, through a further Raman conversion.

In another exemplary embodiment, which is a variant of the foregoing example, the seed source at 1357 nm is replaced by reflection means (e.g. a gold reflector or a fiber Bragg grating with a peak reflectivity at 1357 nm). Spontaneous Raman scattering of the high-power primary pump at 1276 nm produces radiation in the 1357-nm region traveling in both directions in the fiber. As it travels in the fiber, this 1357-nm radiation is amplified due to the Raman gain at 1357 nm produced by the 1276-nm pump. In addition, some of the outgoing 1357-nm radiation undergoes Rayleigh scattering and heads back toward the pump and seed launch terminal, being further amplified as it goes. The 1357-nm reflector sends the incoming amplified spontaneous Raman scattered radiation back into the fiber, where it performs the same role as the 1357-nm seed source in the foregoing example. In an extension of this exemplary embodiment, the 1426-nm seed source is also replaced by a reflector, thereby further reducing the number of active seed sources (e.g. laser diodes) required and further reducing costs.

In embodiments where a ROPA preamplifier is pumped along the transmission fiber itself, the incoming signals experience distributed Raman amplification as they propagate from the ROPA towards the receiving terminal due to the presence in the transmission fiber of high-power at 1426 and 1480 nm and, for signals in the C-band, the present invention provides a much broader and flatter distributed Raman gain profile than the prior art, where the distributed Raman gain is provided solely by high power at 1480 nm.

According to a broad aspect of the present invention, there is provided a system for increasing the amount of pump power that can be delivered to a remote optically pumped amplifier in an optical fiber communication system or, conversely, increasing the distance along the transmission span over which a given amount of pump power can be delivered, and which comprises: a primary pump source at wavelength $\lambda_0$, shorter than the ROPA pump wavelength $\lambda_p$; means to provide substantially lower energy at two or more seed wavelengths $\lambda_{s1} \ldots \lambda_{sn}$, where $n \geq 2$ and $\lambda_0 < \lambda_{sn} \leq \lambda_p$, and where the ensemble of seed sources contains at least one at the ROPA pump wavelength $\lambda_p$; and coupling means to input energy from the primary pump source and energy at the two or more seed wavelengths into said pump delivery fiber which may be either the transmission fiber itself or a dedicated pump fiber; and wherein the primary pump wavelength $\lambda_0$ is less than the wavelength $\lambda_p$ by an amount corresponding to n Raman shifts in the delivery fiber and where the ensemble of seed wavelengths contains one in the vicinity of each intermediate wavelength $\lambda_I$, where I=n−1, n−2 . . . 1, and denotes the number of Raman shifts in the delivery fiber between the wavelength $\lambda_I$ and the ROPA pump wavelength $\lambda_p$.

According to another aspect of the present invention, there is provided a system for increasing the amount of pump power that can be delivered along the transmission fiber to a remote optically pumped preamplifier and at the same time providing a broader, flatter distributed Raman gain profile for the incoming signals as they propagate from the ROPA to the receiving terminal, and which comprises: a primary pump source at wavelength $\lambda_0$, shorter than the ROPA pump wavelength $\lambda_p$; means to provide substantially lower energy at two or more seed wavelengths $\lambda_{s1} \ldots \lambda_{sn}$, where $n \geq 2$ and $\lambda_0 < \lambda_{sn} \leq \lambda_p$, and where the ensemble of seed sources contains at least one at the ROPA pump wavelength $\lambda_p$; and coupling means at the receiving terminal to input energy from the primary pump source and energy at the seed wavelengths into the segment of the transmission fiber between the ROPA and the receiving terminal; and wherein the primary pump wavelength $\lambda_0$ is less than the wavelength $\lambda_p$ by an amount corresponding to n Raman shifts in the delivery fiber and where the ensemble of seed wavelengths contains one in the vicinity of each intermediate wavelength $\lambda_I$, where I=n−1, n−2 . . . 1, and denotes the number of Raman shifts in the delivery fiber between the wavelength $\lambda_I$ and the ROPA pump wavelength $\lambda_p$; and wherein the seed wavelength $\lambda_{sn}$ in the vicinity of $\lambda_{I=1}$ is in the 1420-nm region.

According to a further broad aspect of the present invention, there is provided a method for increasing the amount of pump power that can be delivered to a remote optically pumped amplifier in an optical fiber communication system or, conversely, increasing the distance along the transmission span over which a given amount of pump power can be delivered, the method comprising the steps of: providing a primary pump source at wavelength $\lambda_0$, shorter than the ROPA pump wavelength $\lambda_p$; providing substantially lower energy at two or more seed wavelengths $\lambda_{s1} \ldots \lambda_{sn}$, where $n \geq 2$ and $\lambda_0 < \lambda_{sn} \leq \lambda_p$, and where the ensemble of seed sources contains at least one at the ROPA pump wavelength $\lambda_p$; and propagating the energy at the primary pump and seed wavelengths in the pump delivery fiber which may be either the transmission fiber itself or a dedicated pump fiber; and wherein the primary pump wavelength $\lambda_0$ is less than the wavelength $\lambda_p$ by an amount corresponding to n Raman shifts in the delivery fiber and where the ensemble of seed wavelengths contains one in the vicinity of each intermediate wavelength $\lambda_I$, where I=n−1, n−2 . . . 1, and denotes the number of Raman shifts in the delivery fiber between the wavelength $\lambda_I$ and the ROPA pump wavelength $\lambda_p$.

According to another aspect of the present invention, there is provided a method for increasing the amount of pump power that can be delivered along the transmission fiber to a remote optically pumped preamplifier and at the same time providing a broader, flatter distributed Raman gain profile for the incoming signals as they propagate from the ROPA to the receiving terminal, the method comprising the steps of: providing a primary pump source at wavelength $\lambda_0$, shorter than the ROPA pump wavelength $\lambda_p$; providing substantially lower energy at two or more seed wavelengths $\lambda_{s1} \ldots \lambda_{sn}$, where $n \geq 2$ and $\lambda_0 < \lambda_{sn} \leq \lambda_p$, and where the ensemble of seed sources contains at least one at the ROPA pump wavelength $\lambda_p$; and propagating the energy at the primary pump and seed wavelengths toward the ROPA from the receiving terminal in the segment of the transmission fiber between said ROPA and said receiving terminal; and wherein the primary pump wavelength $\lambda_0$ is less than the wavelength $\lambda_p$ by an amount corresponding to n Raman shifts in the delivery fiber and where the ensemble of seed wavelengths contains one in the vicinity of each intermediate wavelength $\lambda_I$, where I=n−1, n−2 . . . 1, and denotes the number of Raman shifts in the delivery fiber between the wavelength $\lambda_I$ and the ROPA pump wavelength $\lambda_p$; and wherein the seed wavelength $\lambda_{sn}$ in the vicinity of $\lambda_{I=1}$ is in the 1420-nm region.

BRIEF DESCRIPTION OF THE DRAWINGS

The system will be better understood by an examination of the following description, together with the accompanying drawings, in which.

DETAILED DESCRIPTION

Remotely optically pumped amplifiers (ROPAs) provide a means of increasing the span lengths and/or capacities of unrepeatered fiber optic communication links without requiring the placement of any active components out in the span. This greatly simplifies the system, increases the overall reliability and reduces system cost. The maximum link budget improvement possible through the inclusion of ROPAs is directly dependent on the maximum distance over which the required ROPA pump power can be delivered. For ROPA post amplifiers, sufficient pump power must be delivered to ensure that the saturated output power of the ROPA is equal to the maximum composite signal power that can be launched into the transmission fiber without incurring transmission penalties due to nonlinear effects in the fiber. For ROPA preamplifiers, sufficient pump power must be delivered to ensure that the preamplifier has a low noise figure. The further the ROPAs can be placed from the pump launch terminals and still receive the required pump power, the greater the increase in link budget resulting from their inclusion.

In the case of ROPA post amplifiers, the pump power is delivered via one or more dedicated pump fibers (rather than the transmission fiber) to avoid Raman interactions between the pump and the signals leaving the transmitter terminal. ROPA preamplifiers can be pumped along the transmission fiber or along a dedicated pump fiber or a combination of both. When pumped along the transmission fiber, the ROPA pump also provides distributed Raman preamplification for the incoming signals as they propagate from the ROPA preamplifier towards the receiving terminal.

Figure 1:
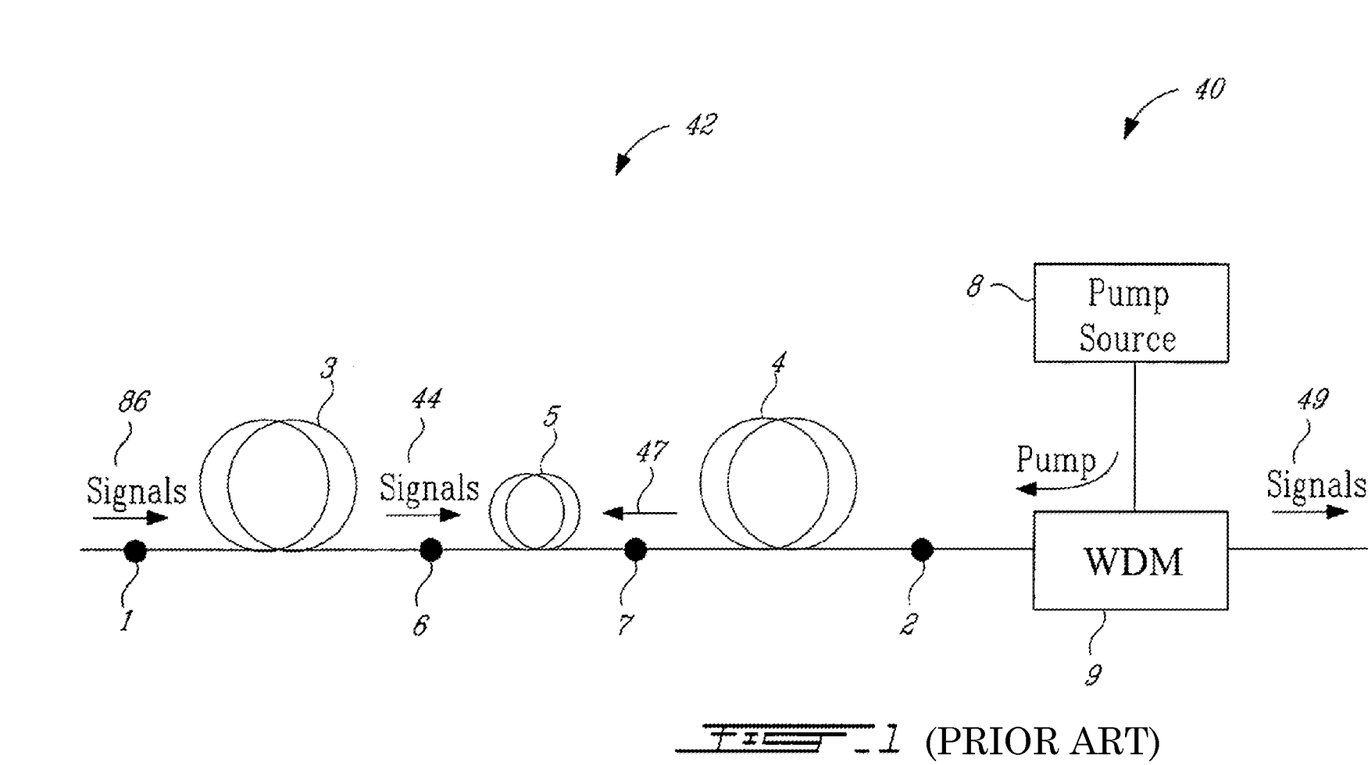
FIG. 1 illustrates an exemplary system with a remote EDFA preamplifier and the prior art direct pumping scheme.

A generic prior art fiber optic telecommunication system employing a remotely pumped preamplifier is shown in FIG. 1. A long unrepeatered optical fiber span is shown generally as 42, and the receiving terminal equipment generally as 40. The long span fiber 42 consists of three component sections, a far fiber 3, a near fiber 4, and a preamplifier erbium-doped fiber segment 5 (typically several tens of meters in length), where the terms "near" and "far" represent distances relative to the receiving terminal 40. The signals 86 propagate from a distant transmitter or repeater terminal 1 down fiber segment 3 to the input 6 of the ROPA preamplifier. The now attenuated signals 44 are then amplified by the preamplifier and proceed from the ROPA output 7 on towards the receiving terminal 2 through fiber segment 4. In the prior art, the remote pump source 8 is typically a high power source at 1480 nm (e.g. a Raman fiber laser), the erbium fiber pump wavelength. The pump output is launched into the transmission fiber in a counter-propagating direction with respect to the signals through the WDM coupler 9. As it propagates towards the ROPA, it is attenuated by the normal fiber attenuation, e.g. typically ~0.2 dB/km in pure silica core fiber (PSCF). The high power at 1480 nm propagating in fiber segment 4 provides distributed Raman amplification for the signals propagating towards the receiving terminal 2.

In a pre-amplifier installation such as illustrated in FIG. 1, fiber 4 is typically $\geq$100 km in length. Locating a pre-amplifier this far back in the span dramatically improves the equivalent Noise Figure (NF) compared to the case where the preamplifier is located at the receiving terminal since the preamplifier's ASE noise is now attenuated by the normal fiber attenuation of fiber 4 before reaching the receiver.

Figure 2:
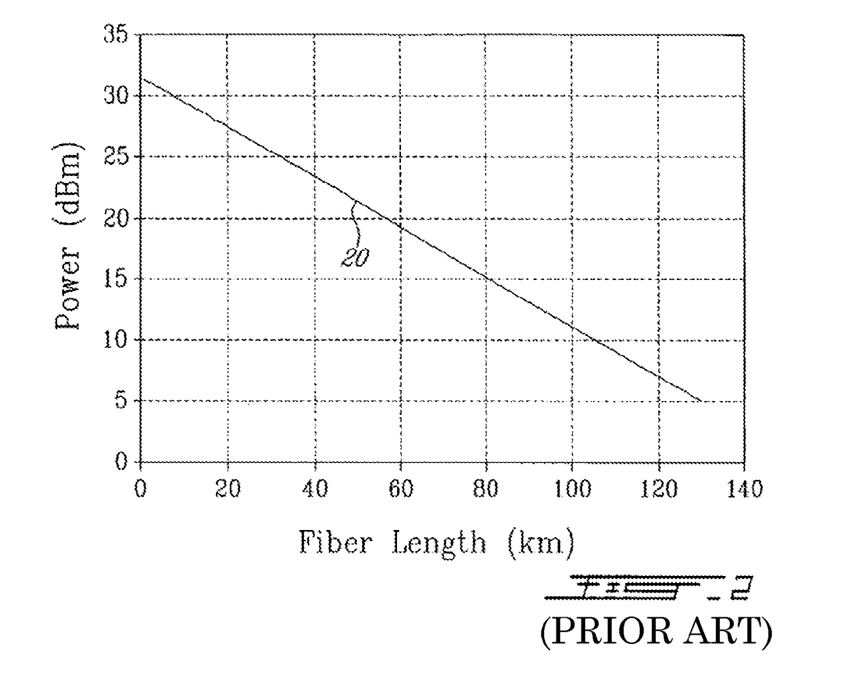
FIG. 2 illustrates the pump power evolution as a function of distance from the pump launch point for the prior art remote pumping scheme.

FIG. 2 shows a graph of pump power evolution versus distance from the pump launch terminal 2 for the case of PSCF with an attenuation at 1480 nm of 0.2 dB/km and a pump launch power of ~1.3 W. The optimum location of the remote preamplifier is a compromise between the desire to move the amplification as far back in the span as possible and the requirement to deliver sufficient pump power to the erbium fiber to ensure sufficient gain and a low noise figure. Typically, this requires a delivered pump power of ~8 to 10 dBm.

At first glance, it might appear that the solution is simply to increase the pump launch power. However, there is a limit to the amount of pump power that can be usefully launched. In PSCF, for example, if the launched pump power is increased beyond ~1.3 W, the resulting high Raman gain (shown in FIG. 3) in the 1590-nm region begins to deplete the 1480-nm power due to the build up of Raman ASE noise and ultimately lasing oscillations near 1590 nm. Furthermore, for a remote preamplifier pumped along the transmission fiber, the distributed Raman gain experienced by signals in portions of the C-band begins to become dangerously high (i.e. greater than ~30 dB) as the launched 1480-nm power approaches 1.3 W and this can result in transmission penalties due multi-path interference (MPI) arising from signal double Rayleigh scattering. In fact, at a 1480-nm launch power of 1.3 W, the Raman gain over the upper 10 nm of the C-band exceeds this maximum limit, rendering this region unusable for signal transmission.

Figure 3:
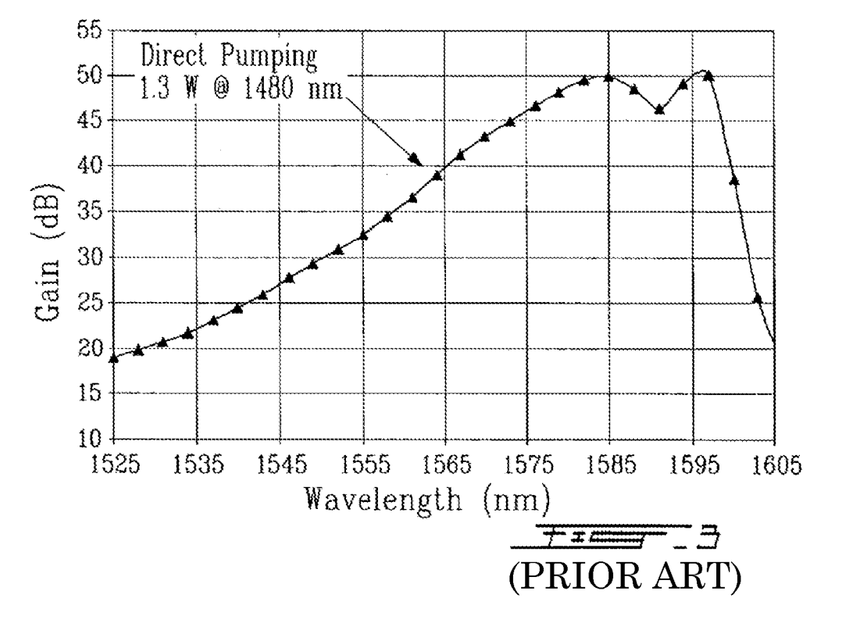
FIG. 3 shows the profile of the distributed Raman gain produced in ~130 km of PSCF when 1.3 W of 1480-nm pump power is launched into the fiber.

FIG. 3 also illustrates that, when pumping along the transmission fiber according to the prior art, the distributed Raman gain experienced by signals in the C-band varies by as much as 20 dB over the full C-band (1530 to 1565 nm) for a 1480-nm launch power of 1.3 W.

Figure 4:
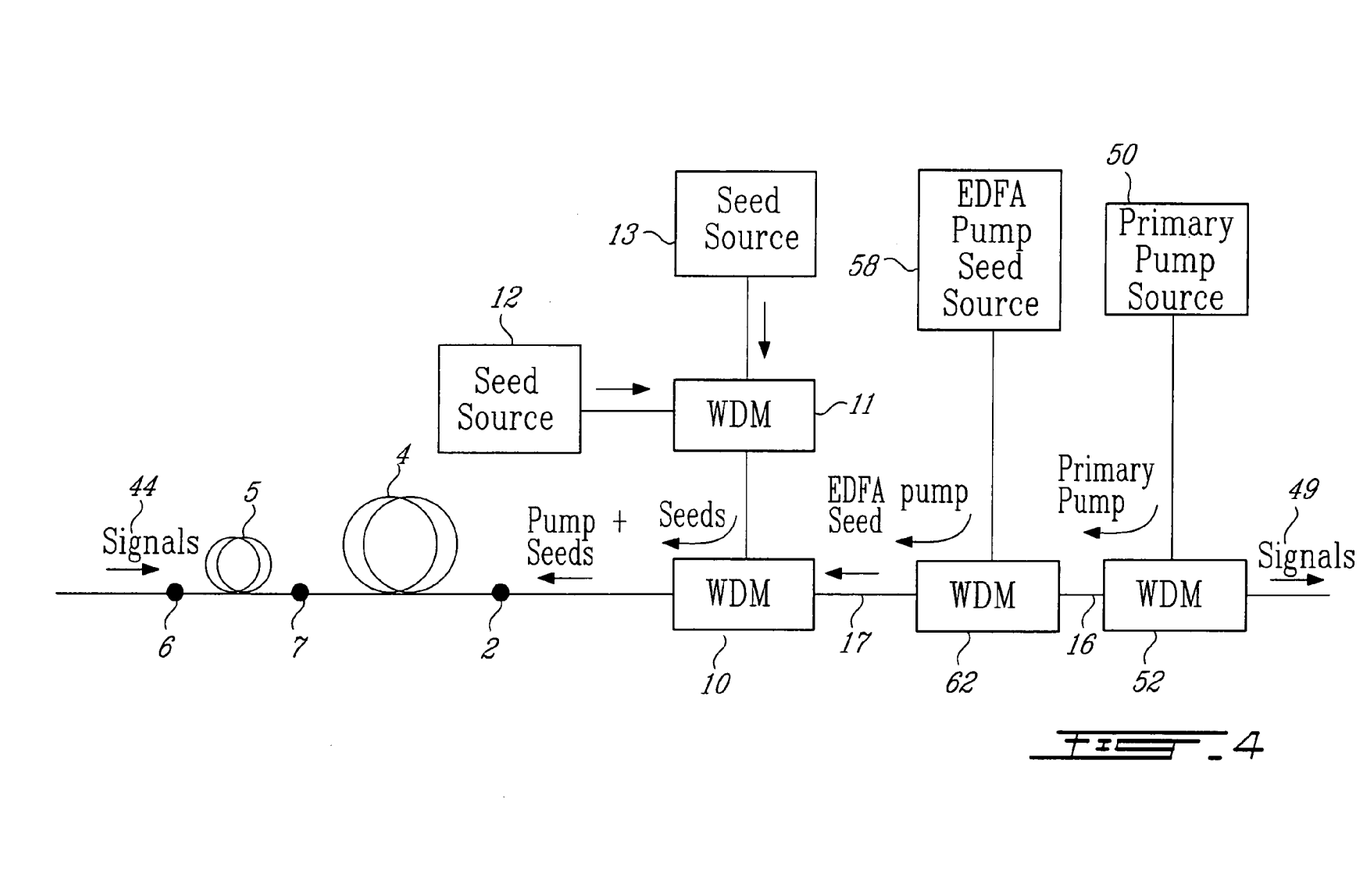
FIG. 4 is an exemplary system showing pumping of a remote EDFA preamplifier using a counter-propagating cascaded Raman pumping scheme in the transmission fiber itself according to the present invention.

FIG. 4 shows a generic system in which the remote EDFA preamplifier 5 is pumped using a counter-propagating cascaded Raman pumping scheme in the transmission fiber itself according to an exemplary embodiment of the present invention. In FIG. 1 and FIG. 4, like numerals refer to like elements.

The output of a high-power primary pump source 50 (typically a Raman fiber laser with an output power of several W) at wavelength $\lambda_O$ is coupled into fiber section 16 via a WDM coupler 52 from where it passes through WDM couplers 62 and 10 and is launched into the transmission fiber segment 4. The output of a low-power (typically <50 mW) EDFA pump seed source 58 (typically a depolarized laser diode) at wavelength $\lambda_p$ is coupled into fiber section 17 via WDM coupler 62 from where it passes through WDM coupler 10 and is launched into fiber segment 4. The outputs of first and second low-power (typically tens of mW) seed sources 12 and 13 (typically depolarized laser diodes) at wavelengths $\lambda_{s1}$ and $\lambda_{s2}$ are combined via a WDM coupler 11, coupled into the transmission fiber segment 4 via WDM coupler 10 and launched to co-propagate with the energy at the EDFA pump seed and primary pump wavelengths.

In the above exemplary embodiment, an essential element of the invention is that the wavelength $\lambda_O$ of the high-power primary pump source is shorter than the EDFA pump wavelength $\lambda_p$. More specifically, $\lambda_O$ must be less than $\lambda_p$ by an amount corresponding to n successive Raman shifts in the transmission fiber, where $n \geq 2$. It is also required that there be a source, among the seed source wavelengths, in the vicinity of each intermediate wavelength $\lambda_I$, where $I = n-1, n-2 \ldots 1$, and denotes the number of Raman shifts in the fiber between the wavelength $\lambda_I$ and the EDFA pump wavelength $\lambda_p$. In addition, it is required that the ensemble of seed source wavelengths $\lambda_{sn}$ includes the EDFA pump wavelength $\lambda_p$. For example, for an EDFA pump wavelength of 1480 nm, $\lambda_O$, $\lambda_{s1}$, $\lambda_{s2}$ and $\lambda_{s3}$ may be chosen as 1276, 1357, 1426 and 1480 nm, respectively. In this example, $n=3$, $\lambda_{s3}$ corresponds to the EDFA pump wavelength of 1480 nm, 1276 nm is less than this wavelength by an amount corresponding to three consecutive Raman shifts in silica fiber, the intermediate wavelength 1357 nm ($\lambda_{s1}$) corresponds to a Raman shift of 468 cm$^{-1}$ from 1276 nm, the second intermediate wavelength 1426 nm ($\lambda_{s2}$) corresponds to a Raman shift of 357 cm$^{-1}$ from 1357 nm and the EDFA pump wavelength of 1480 nm ($\lambda_{s3}$) corresponds to a Raman shift of 255 cm$^{-1}$ from 1426 nm. Although the peak Raman gain in silica fiber corresponds to a Raman shift of ~440 cm$^{-1}$ (13.2 THz), the Raman gain profile is relatively broad (see FIG. 3), providing substantial gain even at Raman shifts significantly less than 440 cm$^{-1}$. In this case, the primary pump energy at 1276 nm provides distributed Raman gain for the seed energy at 1357 nm, thus leading to high power at this wavelength developing out in the transmission fiber. This high power at 1357 nm in turn provides distributed Raman gain for the seed energy at 1426 nm, ultimately leading to the presence of high power at this wavelength even further out in the span and, finally, the high power at 1426 nm provides distributed Raman gain for the 1480-nm seed energy launched from the receiving terminal, resulting in high power at 1480 nm which reaches its peak value ~25 km from the receiving terminal as seen in FIG. 5 where the evolution of the 1480-nm pump power in PSCF as a function of distance from the receiving terminal is shown (curve 22) for this exemplary case, with a 1276-nm launch power of 3.7 W, a pumping level that is still below that which would lead to pump depletion due to excessive Raman gain in the 1590-nm region.

Figure 5:
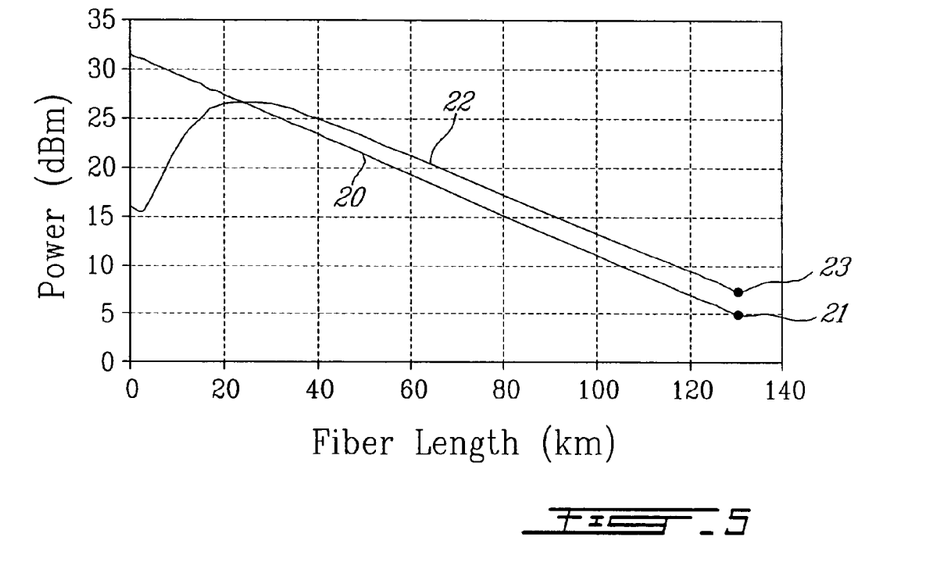
FIG. 5 illustrates a comparison of the pump power evolution as a function of distance from the pump launch point for the prior art direct remote EDFA pumping scheme and a counter-propagating cascaded Raman pumping scheme according to the present invention.

For comparison, FIG. 5 also shows the pump power evolution in PSCF for the prior art direct pumping scheme for the maximum allowable 1480-nm launch power of 1.3 W (curve 20). As can be seen, for pumping according to the present invention even at pumping levels less than the maximum tolerable, the peak value of the power at the EDFA pump wavelength exceeds the maximum 1480-nm power reaching the 25-km point when pumping according to the prior art. From that point on, the 1480-nm power declines in both cases due to the fiber attention at 1480 nm (~0.2 dB/km), although the rate of decline is less for the present cascaded Raman pumping scheme due the continued presence of some Raman gain from the power at 1426 nm propagating in the fiber. The net result is that pumping according to the present invention allows more 1480-nm pump power to be delivered to the ROPA, in this case located 130 km from the receiving terminal, than is possible with the prior art direct pumping scheme.

As noted above, the Raman gain profile in silica fiber is relatively broad, providing substantial Raman gain even at Raman shifts well below 440 cm$^{-1}$. This offers a great deal of flexibility in selecting the optimum intermediate wavelengths and, utilizing an intermediate wavelength in the 1420-nm region with either an intermediate seed (for n=3) or a primary pump (for n=2) in the 1355-nm region, makes it possible to avoid having a pump or seed in the region of the broad 'water' absorption peak of typical fibers at ~1380 nm. This fact further enhances the pump delivery efficiency of the present invention since it avoids unwanted absorptive energy losses.

The choice of primary pump, ROPA pump and intermediate seed wavelengths and powers, the number of primary pump, ROPA pump and intermediate seed wavelengths, the source of the energy at the primary pump, ROPA pump and intermediate seed wavelengths, the number, type and detailed architecture of the pump delivery fiber(s), the type of doped fiber comprising the ROPA, the detailed architecture of the ROPA, the wavelength band of the signals and the coupling means described in the above exemplary embodiment are merely illustrative of the underlying principle of the invention: namely, that the high power required at the ROPA pump wavelength(s) in order to ensure delivery of adequate pump power to the ROPA is developed and/or amplified and/or modified within the transmission fiber and/or dedicated pump fiber(s) through stimulated Raman interactions initiated by launching energy at wavelength(s) shorter than the final ROPA pump wavelength(s) by an amount corresponding to n successive Raman shifts, where $n \geq 2$.

Figure 6:
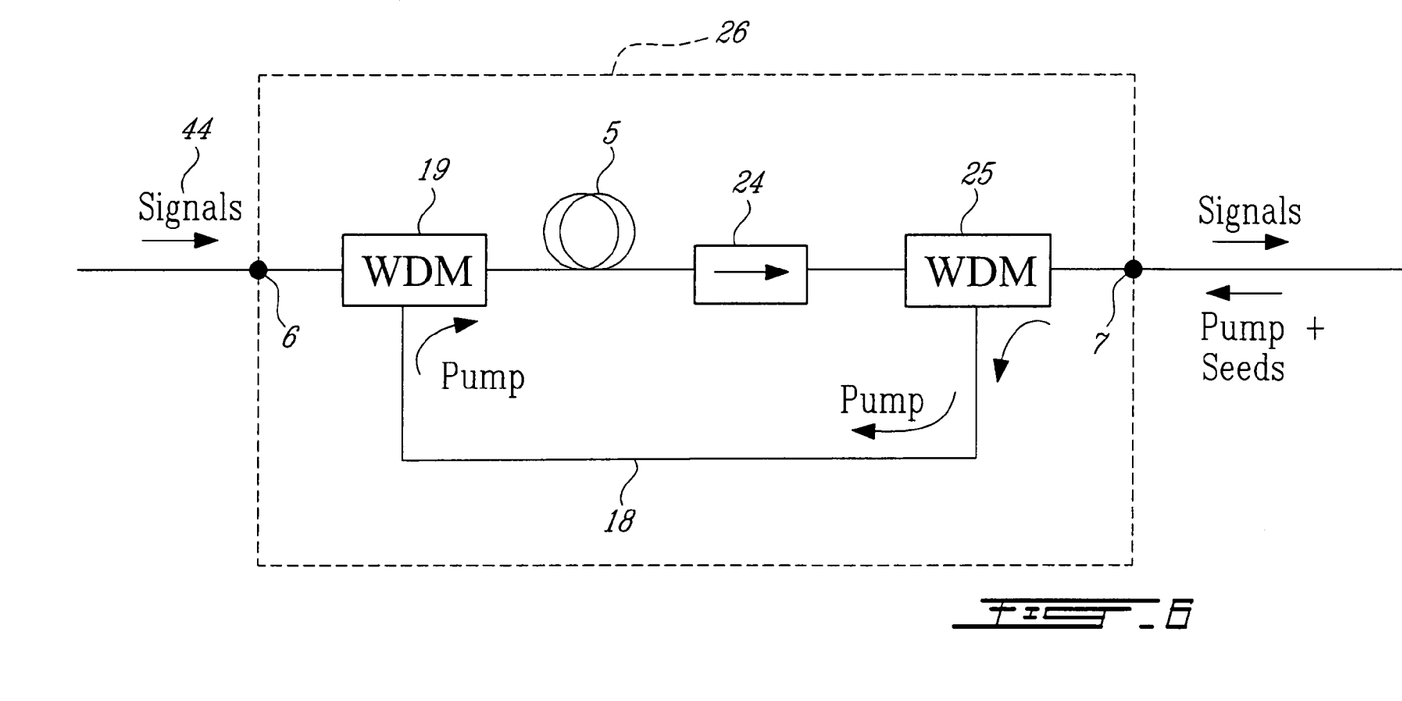
FIG. 6 is an exemplary remote EDFA preamplifier with WDM couplers arranged to route the counter-propagating pump power arriving along the transmission fiber to provide co-pumping of the EDFA to minimize the EDFA noise figure.

For example, in a simplification of the above exemplary embodiment, a primary pump wavelength $\lambda_O$ of 1357 nm and two seed sources at 1426 and 1480 nm could be chosen. Conversely, a primary pump wavelength of 1090 nm (readily available from Yb fiber lasers) and seed sources at 1145, 1205, 1276, 1357, 1426 and 1480 nm could be chosen, yielding a six-step Raman cascade (i.e. n=6). Furthermore, one or more dedicated pump delivery fibers could be added to the cable, with the ROPA being pumped in a similar manner along both the transmission fiber and the dedicated fiber(s) or only along the latter. The delivery fiber(s) may also contain segments of large effective area fiber or Raman ASE filters to reduce pump depletion due to Raman ASE build up. The ROPA architecture may be designed to include WDM couplers 19 and 25, as shown in FIG. 6, arranged to route the counter-propagating pump power arriving along the transmission fiber to provide co-pumping of the EDFA to minimize the EDFA noise figure. It will also be apparent to those skilled in the art that the underlying principle of the invention is not limited to amplification of signals in the C-band nor to delivering pump power solely to erbium-doped remote amplifiers.

Figure 7:
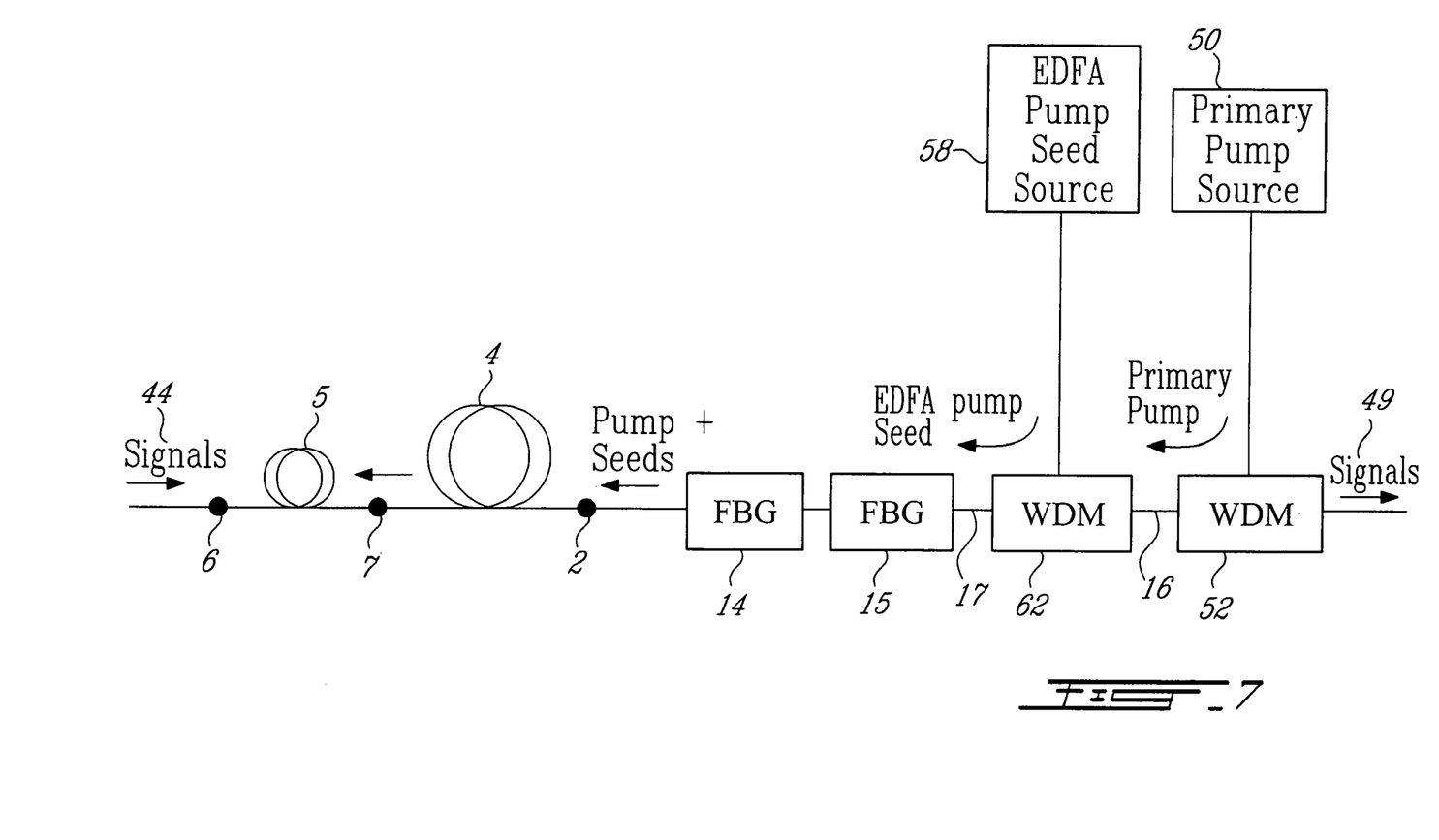
FIG. 7 is an exemplary system showing pumping of a remote EDFA preamplifier via the transmission fiber itself using a counter-propagating primary pump source, a seed source at the EDFA pump wavelength and two seed 'sources' generated by wavelength-specific fiber Bragg grating reflectors.

FIG. 7 shows another exemplary embodiment in which the intermediate seed sources 12 and 13 of FIG. 4 are replaced by reflection means 14 and 15, exemplarily fiber Bragg gratings each with peak reflectivities at $\lambda_{s1}$ and $\lambda_{s2}$, respectively. In FIGS. 4 and 7, like numerals refer to like elements. Referring to FIG. 7, as the high power primary pump energy at wavelength $\lambda_O$ propagates down the transmission fiber, it undergoes spontaneous Raman scattering, producing radiation with the classic Raman-shifted spectral profile traveling in both directions in the fiber. This spontaneous Raman scattered radiation is amplified as it travels in the fiber due to the Raman gain provided by the high power at wavelength $\lambda_o$ present in the fiber. In addition, some of the outgoing spontaneous Raman scattered radiation undergoes backward Rayleigh scattering and is further amplified as it travels back towards terminal 2. Upon reaching terminal 2, that part of the amplified spontaneous Raman scattered radiation (denoted here as ASE by analogy to 'amplified spontaneous emission' in optical amplifiers) at $\lambda_{s1}$ is reflected back into the transmission fiber by reflector 14. In this exemplary embodiment, an amplifying cavity for radiation at the seed wavelength $\lambda_{s1}$ is formed by the reflector 14 and a distributed Rayleigh 'mirror'. This leads to substantial energy at wavelength $\lambda_{s1}$ being present in the transmission fiber in the vicinity of terminal 2, where it performs the same role as the launched seed source at $\lambda_{s1}$ in the example of FIG. 4 and, as discussed in connection with FIG. 4, this leads to the build up of high power at $\lambda_{s1}$ out in the span. The next step in the Raman cascade proceeds in exactly the same manner, with the high power at $\lambda_{s1}$ providing Raman ASE in the region of $\lambda_{s2}$ which is similarly reflected from reflector 15, fulfilling the role of the seed source at $\lambda_{s2}$ in the example of FIG. 4 and leading to the build up of high power at $\lambda_{s2}$ even further out in the span.

The exact details discussed in connection with FIG. 7 are not meant to limit the principles of this embodiment of the invention: namely, that the energy at one or more of the seed wavelengths may be provided by utilizing reflection means in place of active sources (e.g. laser diodes) at the seed wavelengths. For example, alternate reflection means such as a gold reflector coupled to the transmission fiber through a broadband WDM coupler may be used in place of the fiber Bragg gratings.

Figure 8:
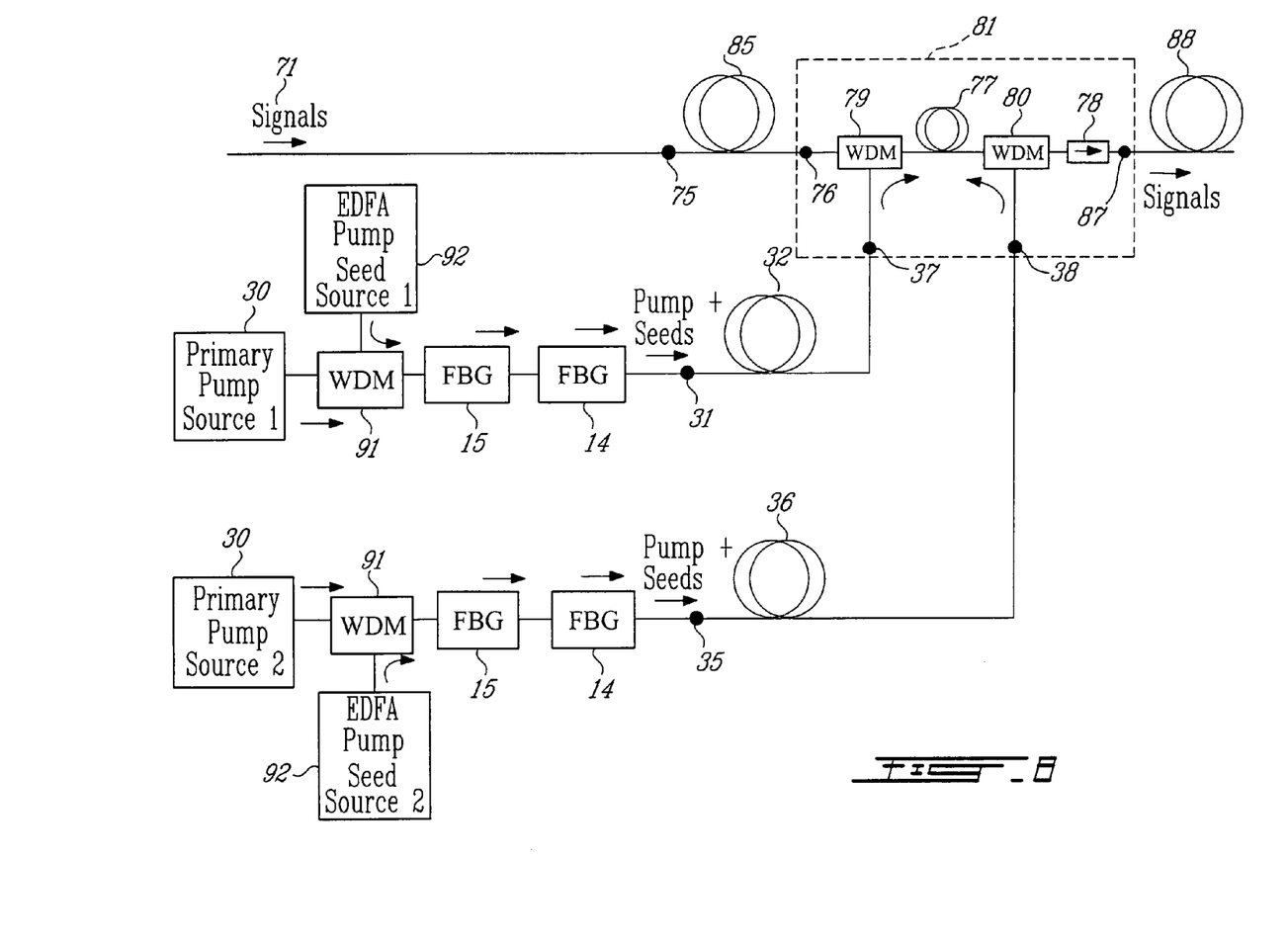
FIG. 8 is an exemplary system showing pumping of a remote EDFA post amplifier using a cascaded Raman pumping scheme over two dedicated pump fibers according to the present invention.

FIG. 8 shows another exemplary embodiment in which a remote post amplifier 81 is pumped from the transmitter terminal along two dedicated pump delivery fibers 32 and 36 incorporated in the fiber optic cable. In FIG. 8, 85 is the segment of the transmission fiber (typically ~50 to 70 km) leading out to the ROPA post amplifier, 86 is the follow-on segment of the transmission span, 78 is an optical isolator and 77 is a length of erbium-doped fiber (typically several tens of meters). In this example, the ROPA pump assemblies feeding each of the pump fibers are identical (although this is certainly not necessary), being comprised of a primary pump source 30 (typically a high-power fiber laser), an EDFA pump seed source 92 at wavelength $\lambda_p$ (typically laser diode), a WDM coupler 91 to combine the outputs of the primary pump and the EDFA pump seed source and two fiber Bragg gratings 14 and 15 with peak reflectivities at $\lambda_{s1}$ and $\lambda_{s2}$, respectively. At the ROPA, the pump power delivered by dedicated pump fiber 32 is coupled into the erbium fiber in a co-propagating direction (with respect to the signals) via a WDM coupler 79 while the pump power delivered by the second dedicated pump fiber 36 is directed into the erbium fiber in a counter-propagating direction via a WDM coupler 80. The dedicated pump fibers 32 and 36 may be the same fiber type as the transmission fiber segment 85 or they may be more complex in architecture. For example, they may incorporate segments of large effective area fiber and/or ASE filters to reduce pump depletion due to Raman ASE build up. The follow-on transmission fiber segment 86 may advantageously consist of an initial segment of large effective area fiber to minimize nonlinear penalties due to the high signal powers launched from the output of the ROPA.

The build up and delivery of the pump power at the ROPA pump wavelength proceeds in the same way as that discussed in connection with FIG. 7. Dedicated pump delivery fibers are used when pumping a remote post amplifier to avoid Raman interactions with the signals traveling out along fiber segment 85. The goal in the case of a remote post amplifier is not to provide distributed Raman gain for the signals, but rather to deliver sufficient pump power to the ROPA so that its saturated output power reaches the maximum tolerable signal launch power as determined by nonlinear transmission penalties. In this way, the effective location of the transmitter terminal is moved out in the span to the ROPA location.

The exact details discussed in connection with FIG. 8 are merely illustrative and are not meant to limit the principles of this embodiment of the invention. For example, two different EDFA pump seed wavelengths in the 1480-nm region could be selected to allow a portion of the pump power delivered by fiber 32 to be split off before reaching WDM coupler 79 and combined via a WDM coupler with the pump power delivered along fiber 36. This would allow the ratio of counter-propagating to co-propagating pump power to be optimized to increase the saturated output power of the ROPA while at the same time ensuring a sufficiently-low noise figure.

Figure 9:
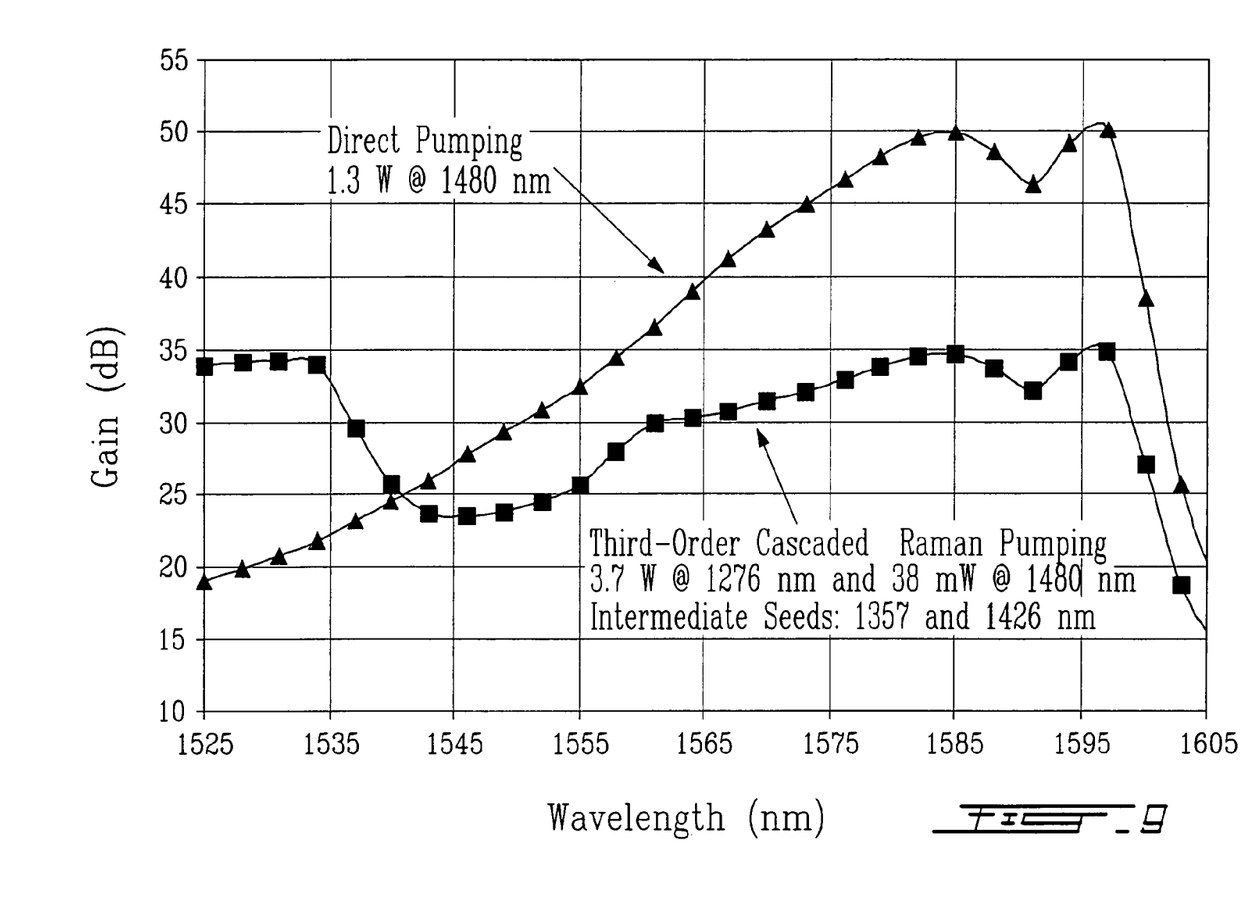
FIG. 9 shows a comparison of the profile of the distributed Raman gain experienced by the signals for pumping of a remote preamplifier along the transmission fiber for the prior art direct pumping scheme and third-order cascaded Raman pumping according to the present invention.
Figure 10:
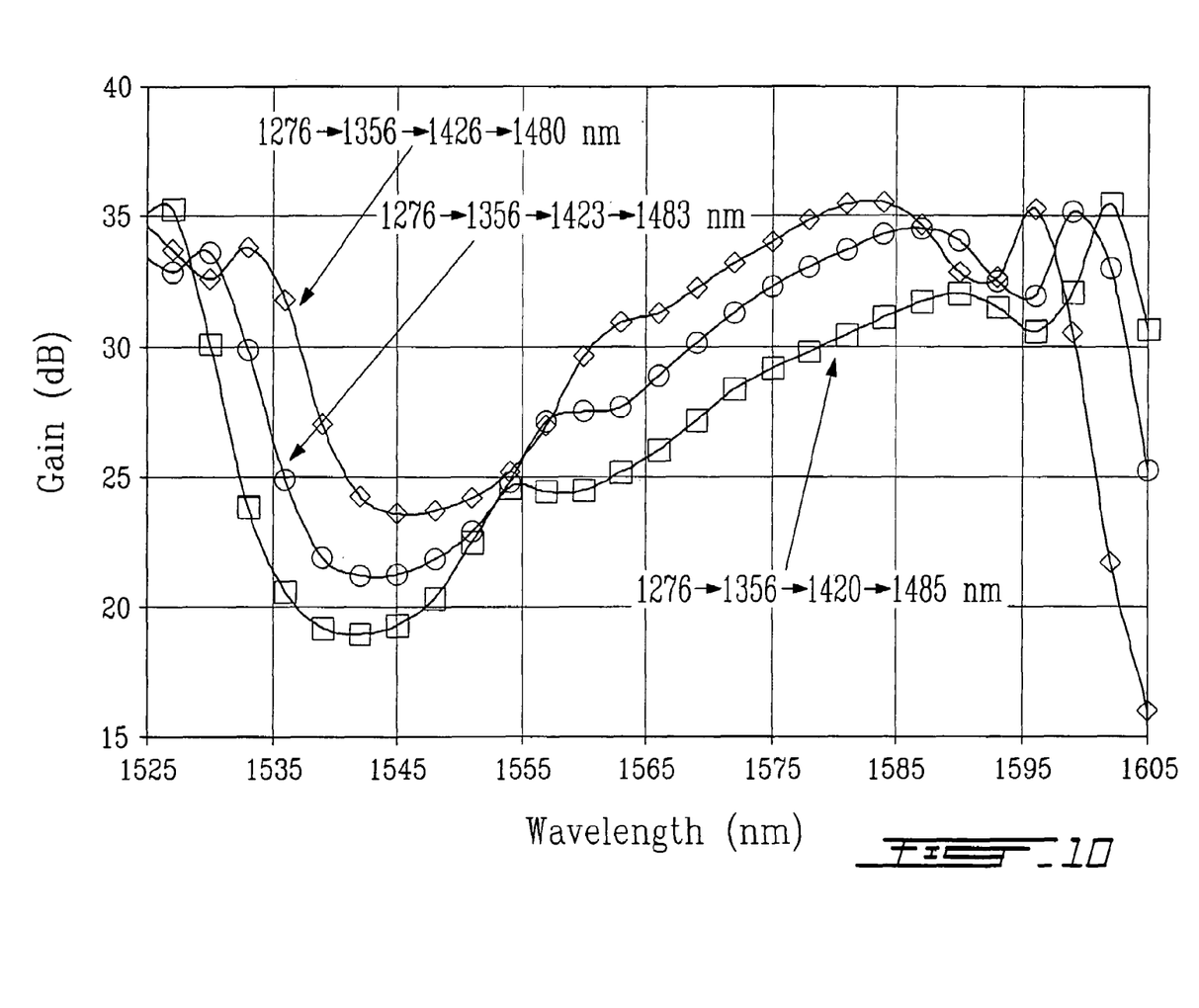
FIG. 10 shows how the profile of the C-band distributed Raman gain experienced by the signals for pumping of a remote preamplifier along the transmission fiber according to the present invention can be flattened by optimizing the choice of the intermediate seed wavelength in the 1420-nm region and the EDFA pump seed wavelength near 1480 nm.

FIGS. 9 and 10 illustrate a further aspect of the present invention. FIG. 9 shows a comparison of the profile of the distributed Raman gain experienced by the signals for pumping of a remote preamplifier along the transmission fiber for the prior art direct pumping scheme as per FIG. 1 and third-order cascaded Raman pumping according to the present invention as shown in FIGS. 4 and 7. For the direct pumping scheme, the Raman gain varies by as much as 20 dB over the C-band, 1530 to 1565 nm and, from 1550 to 1565 nm, it exceeds 30 dB, which is approximately the maximum tolerable gain without multi-path interference (MPI) transmission penalties due to double Rayleigh signal scattering. This latter fact renders this portion of the C-band unusable for signal transmission. In the case of third-order cascaded Raman pumping with intermediate seed wavelengths of 1357 and 1426 nm and an EDFA pump seed wavelength of 1480 nm, despite the fact that the pump power delivered to the ROPA preamplifier is greater than that for the direct pumping scheme (see FIG. 5), the gain variation over the whole C-band is only ~11 dB and, more importantly, the gain in the band only exceeds 30 dB in the region below 1537 nm. Therefore, the gain is flatter and a greater portion of the C-band is accessible for signal transmission.

FIG. 9 also shows that, for the cascaded pumping scheme, there is room to increase the delivered pump power still further, by increasing the 1276-nm launch power, since the Raman gain in the 1590 nm region is still below the level at which pump depletion would occur due to the build up of Raman ASE and lasing oscillations; although, with the above choice of seed wavelengths, this would come at the expense of usable bandwidth for signal transmission, since the Raman gain would then exceed 30 dB over a greater portion of the C-band. Confronting these conflicting aims illustrates a further advantage of the present invention over prior art pumping schemes. Having an intermediate seed wavelength in the 1420-nm region, coupled with the breadth of the Raman gain in silica fiber and the relative insensitivity of the EDFA gain to pump wavelength when pumping in the 1480-nm region, makes it possible to fine tune the profile of the gain across the C-band through the judicious selection of the intermediate and EDFA pump seed wavelengths, thereby expanding the usable signal bandwidth for a given delivered ROPA pump power. FIG. 10 shows the distributed Raman gain profiles for three different selections of the intermediate and EDFA pump seed wavelengths and for identical delivered ROPA pump powers. The gain below ~1540 nm is primarily due to the power at the intermediate seed wavelength present in the fiber while, at longer wavelengths, it is largely due to the power at the EDFA seed wavelength. As can be seen in FIG. 10, moving the intermediate seed wavelength down from 1426 to 1420 nm and the EDFA pump seed wavelength from 1480 to 1485 nm substantially reduces the gain at both ends of the C-band, thereby making the entire C-band usable for signal transmission at this level of delivered ROPA pump power. Furthermore, this is accomplished without significantly increasing the peak-to-peak gain variation across the C-band. Conversely, in systems where the signals occupy less than the full 35 nm of the C-band, the delivered ROPA pump power could be increased still further without a severe penalty in usable signal bandwidth.

This flexibility in tailoring the profile of the Raman gain experienced by the signals is a direct result of the cascaded Raman pumping architecture of the present invention with an intermediate seed wavelength in the 1420-nm region.

EXAMPLE

An experimental fiber-optic transmission span, incorporating a ROPA post amplifier and a ROPA preamplifier, was setup. Sumitomo Z PSCF (loss at 1550 nm=0.17 dB/km) was used throughout. The remote post amplifier was located 70 km from the transmitter terminal and was pumped along two dedicated pump fibers by two identical cascaded Raman pump modules substantially as shown in FIG. 8. The long-span fiber 88 carrying the signals from the output of the post amplifier towards the ROPA preamplifier was 314 km in length. A variable optical attenuator was inserted just before the remote preamplifier input to add an additional 3 dB of span loss. The ROPA preamplifier architecture was substantially as shown in FIG. 6 and it was pumped from the receiving terminal along the transmission fiber by a cascaded Raman pump module substantially as shown in FIG. 7. The fiber segment 4 between the receiving terminal and the ROPA preamplifier was 131 km long. The total span length was therefore 70+314+131=515 km in length, yielding a total optical loss at the C-band signal wavelengths of 87.5 dB. The added VOA loss (equivalent to 18 km of fiber) brought the total loss to 90.5 dB.

The three cascaded Raman pump modules each provided a primary pump power of 3.7 W at 1276 nm, an EDFA pump seed power of 40 mW and included fiber Bragg grating reflectors at intermediate seed wavelengths of 1357 and 1426 nm. The ROPA preamplifier had a gain of 18 dB and a NF of 5 dB when pumped by 5 mW of 1480-nm power. The use of the cascaded Raman pumping scheme allowed both the ROPA post amplifier and preamplifier to be placed ~12 km further from their respective pump terminal than would have been possible using the prior art direct pumping scheme, thereby increasing the total span length by 24 km. Transmission over this link of 4 STM16 (2.5 Gb/s) channels with wavelengths spanning the 1551.5 to 1554-nm range was demonstrated with a BER of $10^{-10}$. With the addition of forward error correction (FEC), the total span loss budget for error-free transmission increases to 94.5 dB, equivalent to a span length of 556 km.

The invention claimed is:

1. A system to deliver pump power to a remote optically pumped amplifier (ROPA) in an optical fiber communication span, the span comprising a signal carrying fiber with the ROPA spliced into the signal carrying fiber at a distance from either the transmitter end for post-amplification or from the receiver end for pre-amplification, and the ROPA being pumped by optical power at a pump wavelength $\lambda_p$ carried by at least one pump delivery fiber, said at least one pump delivery fiber having Raman properties whereby effective transmission of power at the pump wavelength $\lambda_p$ is limited by a maximum launch power at $\lambda_p$, the system comprising for each pump delivery fiber:

a primary pump source at wavelength $\lambda_0$, shorter than the ROPA pump wavelength $\lambda_p$;

means to provide substantially lower power at two or more seed wavelengths $\lambda_{s1}$ . . . $\lambda_{sn}$, where $n \geq 2$ and $\lambda_0 < \lambda_{sn} \leq \lambda_p$, and where the ensemble of seed wavelengths contains at least one at the ROPA pump wavelength $\lambda_p$;

coupling means to input power from the primary pump source and power at the two or more seed wavelengths into said pump delivery fiber at said transmitter end for post-amplification or at said receiver end for pre-amplification, wherein:

the primary pump wavelength is less than the wavelength $\lambda_p$ by an amount corresponding to n Raman shifts in the delivery fiber and where the ensemble of seed wavelengths contains one in the vicinity of each intermediate wavelength $\lambda^l$, where l=n−1, n−2 . . . 1, and denotes the number of Raman shifts in the delivery fiber between the wavelength $\lambda^l$ and the ROPA pump wavelength $\lambda_p$, and said primary pump and said means to provide substantially lower power at two or more seed wavelengths are configured to cause said power from the primary pump source and power at two or more seed wavelengths coupled into said pump delivery fiber to provide more power at the pump wavelength $\lambda_p$ to the ROPA than would be provided by coupling the maximum input power level at the pump wavelength $\lambda_p$ into said pump delivery fiber at said transmitter or receiver end.

2. The system as claimed in claim 1, wherein said ROPA is a ROPA pre-amplifier and the said at least one pump delivery fiber is the signal carrying fiber linking the ROPA and said receiver end.

3. The system as claimed in claim 1, wherein said ROPA is a ROPA pre-amplifier and the said at least one pump delivery fiber comprises the signal carrying fiber linking the ROPA and said receiver end and one or more dedicated pump delivery fibers.

4. The system as claimed in claim 1, wherein said ROPA is a ROPA pre-amplifier and the said at least one pump delivery fiber comprises one or more dedicated pump delivery fibers.

5. The system as claimed in claim 2, wherein at least one of the $\lambda_{s1}$ . . . $\lambda_{sn}$ are selected to control the profile of the distributed Raman gain experienced by the signals due to the power at the $\lambda_{s1}$ . . . $\lambda_{sn}$ present in the signal carrying fiber so as to limit the distributed Raman gain experienced by the signals to be below a maximum tolerable gain at which multi-path interference (MPI) transmission penalties due to double Rayleigh signal scattering would arise and thus make a greater portion of the transmission band accessible for signal transmission.

6. The system as claimed in claim 1, wherein said ROPA is a ROPA pre-amplifier further comprising means to couple light from the said at least one pump delivery fiber into the ROPA amplifying fiber in a co-propagating direction with respect to the signals.

7. The system as claimed in claim 1, wherein said ROPA is a ROPA pre-amplifier, and said substantially lower power provided at one or more of said two or more seed wavelengths is provided by depolarized laser diodes.

8. The system as claimed in claim 1, wherein the said ROPA is a post-amplifier and the said at least one pump delivery fiber comprises one or more dedicated pump delivery fibers.

9. The system as claimed in claim 8, further comprising means to couple light into the ROPA amplifying fiber in both a co-propagating and a counter-propagating direction with respect to the signals.

10. The system as claimed in claim 9, wherein the ROPA is pumped by two dedicated pump fibers $PF_1$ and $PF_2$ and wherein the ROPA pump wavelength in $PF_1$ is deliberately chosen to be different from, but closely spaced to, that in $PF_2$ and further comprising means to divide the ROPA pump power delivered by $PF_1$ into two amounts of predetermined magnitude and means to combine one of said two amounts with the ROPA pump delivered by $PF_2$ prior to coupling the pump power into the ROPA amplifying fiber, so as to optimize the ratio of co-propagating and counter-propagating pump power coupled into the ROPA amplifying fiber.

11. The system as claimed in claim 1, wherein said means to provide substantially lower power at said two or more seed wavelengths $\lambda_{s1} \ldots \lambda_{sn}$ includes reflection means to return into said pump delivery fiber amplified spontaneous Raman scattered radiation, originating in said pump delivery fiber due to the presence of high power at a wavelength one Raman shift below the particular seed wavelength.

12. The system as claimed in claim 1, wherein the primary pump source is an Yb fiber laser operating at a wavelength in the 1090-nm region and the number of Raman shifts n between the primary pump wavelength $\lambda_0$ and the pump wavelength $\lambda_p$ equals 6 and further comprising 5 fiber Bragg grating reflectors to provide the said substantially lower power at the intermediate seed wavelengths $\lambda_{si} \neq \lambda_p$.

13. The system as claimed in claim 1, wherein the primary pump wavelength $\lambda_0$ and the number and position of the intermediate seed wavelengths $\lambda_{si} \neq \lambda_p$ are chosen specifically so as to avoid the water absorption peak in the pump delivery fiber.

14. A method for pumping remote optically-pumped fiber amplifiers (ROPAs) in fiber-optic telecommunication systems, the span comprising a signal carrying fiber with the ROPA spliced into the signal carrying fiber at a distance from either the transmitter end for post-amplification or from the receiver end for pre-amplification, and the ROPA being pumped by power at a pump wavelength $\lambda_p$ carried by at least one pump delivery fiber, said at least one pump delivery fiber having Raman properties whereby effective transmission of power at the pump wavelength $\lambda_p$ is limited by a maximum launch power at $\lambda_p$, the method comprising:

selecting primary pump wavelength $\lambda_0$, shorter than the ROPA pump wavelength $\lambda_p$;

selecting two or more seed wavelengths $\lambda_{s1} \ldots \lambda_{sn}$, where $n \geq 2$ and $\lambda_0 < \lambda_{sn} \leq \lambda_p$, and where the ensemble of seed wavelengths contains at least one at the ROPA pump wavelength $\lambda_p$;

coupling power at the primary pump wavelength and at the two or more seed wavelengths into said pump delivery fiber at said transmitter end for post-amplification or at said receiver end for pre-amplification, such that cascaded Raman amplification is used to deliver pump power to the ROPA that exceeds the pump power provided by coupling the maximum input power level at the pump wavelength $\lambda_p$ into said pump delivery fiber at said transmitter or receiver end.

15. The method as claimed in claim 14, wherein said ROPA is a ROPA pre-amplifier and said at least one pump delivery fiber includes the signal carrying fiber, further comprising selecting at least one of the $\lambda_{s1} \ldots \lambda_{sn}$ to control the profile of the distributed Raman gain experienced by the signals due to the power at the $\lambda_{s1} \ldots \lambda_{sn}$ present in the signal carrying fiber, so as to limit the distributed Raman gain experienced by the signals to be below a maximum tolerable gain at which multi-path interference (MPI) transmission penalties due to double Rayleigh signal scattering would arise and thus make a greater portion of the transmission band accessible for signal transmission.

16. The method as claimed in claim 14, wherein said ROPA is a post-amplifier, further comprising incorporating means to couple light into the ROPA amplifying fiber in both a co-propagating and a counter-propagating direction with respect to the signals.

17. The method as claimed in claim 16, wherein said ROPA is pumped by two dedicated pump fibers $PF_1$ and $PF_2$ and wherein the ROPA pump wavelength in $PF_1$ is deliberately chosen to be different from, but closely spaced to, that in $PF_2$ and further comprising incorporating means to divide the ROPA pump power delivered by $PF_1$ into two amounts of predetermined magnitude and means to combine one of said two amounts with the ROPA pump power delivered by $PF_2$ prior to coupling the pump power into the ROPA amplifying fiber, so as to optimize the ratio of co-propagating and counter-propagating pump power coupled into the ROPA amplifying fiber.

18. The method as claimed in claim 14, wherein said coupling of power at said two or more seed wavelengths into said pump delivery fiber comprises using passive reflective means for coupling said power at one or more of said two or more seed wavelengths.

19. The method as claimed in claim 14, further comprising selecting an Yb fiber laser operating at a wavelength in the 1090-nm region as the primary pump source and the number of Raman shifts n between the primary pump wavelength $\lambda_0$ and the pump wavelength $\lambda_p$ to equal 6 and further comprising using 5 fiber Bragg grating reflectors to couple said power at the intermediate seed wavelengths $\lambda_{si} \neq \lambda_p$ into said pump delivery fiber.

20. The method as claimed in claim 14, further comprising selecting the primary pump wavelength $\lambda_0$ and the number and position of the intermediate seed wavelengths $\lambda_{si} \neq \lambda_p$ specifically so as to avoid the water absorption peak in the pump delivery fiber.

21. The system as claimed in claim 3, wherein at least one of the $\lambda_{s1} \ldots \lambda_{sn}$ are selected to control the profile of the distributed Raman gain experienced by the signals due to the power at the $\lambda_{s1} \ldots \lambda_{sn}$ present in the signal carrying fiber, so as to limit the distributed Raman gain experienced by the signals to be below a maximum tolerable gain at which multi-path interference (MPI) transmission penalties due to double Rayleigh signal scattering would arise and thus make a greater portion of the transmission band accessible for signal transmission.

* * * * *